US009201698B2

(12) United States Patent
Ashok et al.

(10) Patent No.: US 9,201,698 B2
(45) Date of Patent: *Dec. 1, 2015

(54) SYSTEM AND METHOD TO REDUCE MEMORY USAGE BY OPTIMALLY PLACING VMS IN A VIRTUALIZED DATA CENTER

(71) Applicant: International Business Machines Corporation, Armonk, NY (US)

(72) Inventors: Rohith Kottamangalam Ashok, Apex, NC (US); Matt Richard Hogstrom, Cary, NC (US); Tiia Salo, Cary, NC (US); Meeta Yadav, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/862,465

(22) Filed: Apr. 15, 2013

(65) Prior Publication Data

US 2013/0232501 A1    Sep. 5, 2013

Related U.S. Application Data

(63) Continuation of application No. 13/356,565, filed on Jan. 23, 2012.

(51) Int. Cl.
*G06F 9/455* (2006.01)
*G06F 9/50* (2006.01)
*G06F 9/48* (2006.01)

(52) U.S. Cl.
CPC .......... *G06F 9/5016* (2013.01); *G06F 9/45558* (2013.01); *G06F 9/4856* (2013.01); *G06F 9/5033* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 8,484,356 B1* | 7/2013 | Douglis et al. | 709/226 |
| 2005/0257264 A1* | 11/2005 | Stolfo et al. | 726/23 |
| 2009/0183159 A1* | 7/2009 | Michael et al. | 718/101 |
| 2009/0204959 A1* | 8/2009 | Anand et al. | 718/1 |
| 2011/0099187 A1* | 4/2011 | Hansen | 707/769 |
| 2011/0099318 A1* | 4/2011 | Hudzia et al. | 711/6 |
| 2011/0131571 A1* | 6/2011 | Heim | 718/1 |
| 2011/0214123 A1* | 9/2011 | Lublin et al. | 718/1 |
| 2011/0239215 A1* | 9/2011 | Sugai | 718/1 |
| 2013/0036418 A1* | 2/2013 | Yadappanavar et al. | 718/1 |
| 2013/0232491 A1* | 9/2013 | Radhakrishnan et al. | 718/1 |

OTHER PUBLICATIONS

Wood, et al., "Memory Buddies: Exploiting Page Sharing for Smart Collocation in . . . ," Proc. of the 5th ACM Intl. Conf. On Virtual Execution Environments, 2009.

* cited by examiner

*Primary Examiner* — Tammy Lee
(74) *Attorney, Agent, or Firm* — Steven M. Greenberg, Esq.; CRGO Law

(57) ABSTRACT

Embodiments of the present invention provide a method, system and computer program product for collocating VMs based on memory sharing potential. In an embodiment of the invention, a VM co-location method has been claimed. The method includes selecting a VM from amongst different VMs for server colocation. The method additionally includes computing an individual shared memory factor for each of a set of the VMs with respect to the selected VM. The method yet further includes determining a VM amongst the VMs in the set associated with a highest computed shared memory factor. Finally, the method includes co-locating the determined VM with the selected VM in a single server.

4 Claims, 3 Drawing Sheets

SYSTEM AND METHOD TO REDUCE MEMORY USAGE BY OPTIMALLY PLACING VMS IN A VIRTUALIZED DATA CENTER

CROSS-REFERENCE TO RELATED APPLICATIONS

This application claims priority to U.S. patent application Ser. No. 13/356,565, currently pending, filed Jan. 23, 2012, the entirety of which is incorporated herein by reference.

BACKGROUND OF THE INVENTION

1. Field of the Invention

The present invention relates to virtualization and more particularly to virtual machines on multiple hosts.

2. Description of the Related Art

A virtual machine (VM) or virtual computer is a logical representation of a computer implemented within computer software. In a traditional physical computer, one instance of the operating system supports one or more application programs. In a virtualization environment, however, a single physical computer, or cluster of physical computers, runs software that abstracts the resources of a physical computer so that the resources of the physical computer may be shared between multiple virtual computers or VMs. To that end, each VM may be running a different operating system from all of the other virtual machines on the physical machine. Of import, a crash or other program error resulting in any of the VMs leaves all of the other VMs unaffected in the single physical computer.

There are different types of virtualization, including desktop virtualization and server virtualization. Desktop virtualization moves the operating system and the applications it supports from a desktop computer to a virtual computer running on a server. A user can still customize the desktop environment. In addition, unlike when working on a traditional single physical computer, when a user moves to a different location, the entire workspace of the user appears on whichever workstation or device the user is currently using. If the workstation hardware should fail, the entire workspace of the user is available on any other workstation on the network.

Server virtualization allows a physical server to be apportioned to run multiple secure virtual machines (VMs) or virtual servers. This creates an opportunity to consolidate physical servers. In addition, as the resource requirements of one of the server-based products running in a VM grows, moving the VM to a different physical server with more available resources is as simple as copying a file. Generally, VMs, in multiple server environments, are placed on different physical servers based on static analysis of CPU utilization and memory usage.

In the case of a single server environment, virtualization solutions use content based page sharing to consolidate memory resources in a server platform. Page sharing allows identical pages to be shared across VMs, which eliminates redundant pages and frees up memory resources. In operation, a hypervisor scans the memory for duplicate pages. On detecting a duplicate page the hypervisor eliminates one of the duplicate pages and alters virtual memory to point to the shared copy, but this approach is limited to VMs on a single server.

BRIEF SUMMARY OF THE INVENTION

Embodiments of the present invention address deficiencies of the art in respect to collocating VMs in a multi-server environment and provide a novel and non-obvious method, system and computer program product for collocating VMs based on memory sharing potential. In an embodiment of the invention, a VM co-location method has been claimed. The method includes selecting a VM from amongst different VMs for server colocation. The method additionally includes computing an individual shared memory factor for each of a set of the VMs with respect to the selected VM. The method yet further includes determining a VM amongst the VMs in the set associated with a highest computed shared memory factor. Finally, the method includes co-locating the determined VM with the selected VM in a single server.

In an aspect of the embodiment, the individual shared memory factor can be computed by creating a first Bloom filter for each of the VMs in the set, and then a second Bloom filter for the selected VM. For instance, the Bloom filters can be of the startup Bloom filter type, or the current Bloom filter type. Thereafter, the first and second Bloom filters can be combined for each of the VMs in the set to produce an individual shared memory factor for each of the VMs in the set. For example, combining the first and second Bloom filters can include performing for each of the VMs a logical AND operation between values in the first Bloom filter and corresponding values in the second Bloom filter and adding bits of a result of the AND operation for each of the VMs to generate the individual shared memory factor for a corresponding one of the VMs.

In another embodiment of the invention, a virtual machine collocating system can be provided. The system can include a cluster of servers, each with at least one processor and memory. The system also can include multiple different VMs executing in the cluster of servers and a hypervisor executing in memory of one of the servers. The system also can include a VM collocate module coupled to the hypervisor. The module can include program code enabled to select a VM from amongst the VMs for server colocation, to compute an individual shared memory factor for each of a set of the plurality of VMs with respect to the selected VM, to determine a VM amongst the VMs in the set associated with a highest computed shared memory factor, and to co-locate the determined VM with the selected VM in a single one of the servers in the cluster.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for collocating a VM in a multi-server environment. The determination of whether or not to collocating a selected VM with other VMs in a particular server can be based upon determining a memory sharing factor for the selected VM with respect to other VMs. In this regard, the memory sharing factor can be determined according to a Bloom filter—a space-efficient probabilistic data structure used to test whether an element is a member of a set in response to which the test returns either "possibly inside set" or "definitely not in set". The VM amongst the other VMs with which the selected VM sharing the highest computed memory sharing factor can be co-located together in the same server. In this way, placement of the VM in respect to a particular server can be based upon not only processor utilization and memory usage information, but also page sharing potential amongst different VMs.

Figure 1:
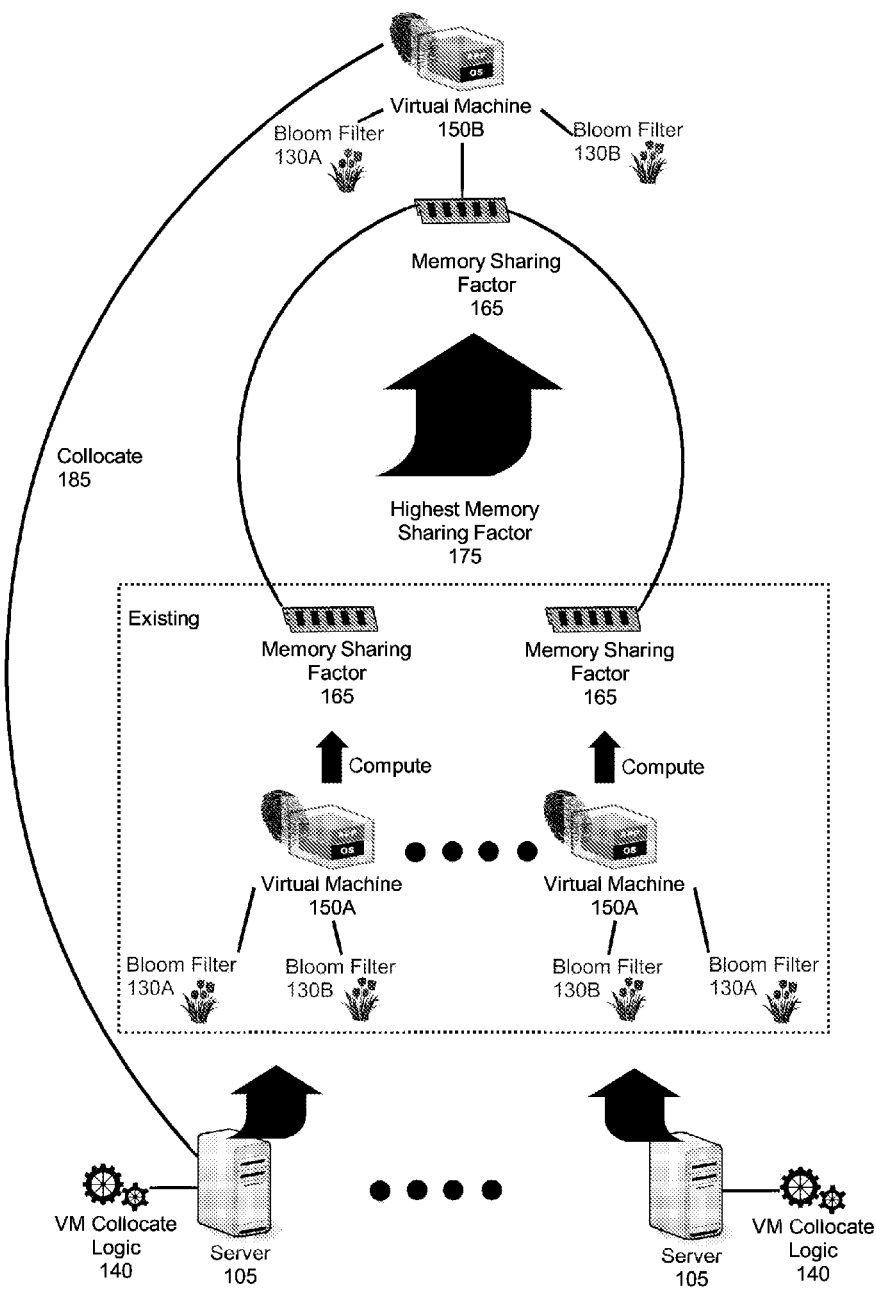
FIG. 1 is a pictorial illustration of a process for collocating a VM in a multi-server environment.

In further illustration, FIG. 1 pictorially shows a process for collocating a VM in a multi-server environment. As shown in FIG. 1, multiple servers 105 can have a plurality of virtual machines (VMs) 150A. (For simplicity, the same plurality of VMs 150A is shown for both machines, though a plurality of VMs 150A can be on each server 105 or, any server 105 in a network.) VM collocate logic 140 on a server 105 can generate a hash value for all pages at startup time. The hash value can then be used to index into a Bloom filter 130A, for instance, a "startup" Bloom filter, and then the corresponding bits can be set to one. As the memory of the VM 150A changes with successive writes, new hash values can be computed by the VM collocate logic 140 and used to index into a second Bloom filter 130B, for instance a "current" Bloom filter, with the corresponding bits set to one.

When a new VM needs to be placed, for instance VM 150B, a Bloom filter 130A can be generated, such as a "startup" Bloom filter for the new VM 150B. The "startup" Bloom filter 130A values of the existing VMs, for instance VM 150A, and the "startup" Bloom filter 130A of the new VM 150B can be compared, for instance, by performing an AND operation. The bits of the result are added to compute a memory sharing factor 165. The VM 150B can then be collocated 185 with VMs 150A with which the VM 150B has the highest memory sharing factor 175.

For a live migration, a Bloom filter 130B, for instance a "current" Bloom filter or a "counting" Bloom filter, can be used to compute the memory sharing factor 165. The "current" Bloom filter 130B of the migrating VM 150B is compared against the "current" Bloom filter 130B of other VMs 150A with which collocation is possible. VM collocate logic 140 on a server 105 can perform an AND operation on the Bloom filters 130B, the "current" Bloom filter on the existing VMs 150A and the "current" Bloom filter on the migrating VM 150B. Upon performing the AND operation, VM collocate logic 140 can compute the memory sharing factor 165 by adding the bits of the result of the AND operation. The migrating VM, for instance 150B, can then be placed with a VM 150A offering the most memory sharing benefit.

Of note, the information regarding the memory sharing factor 165 for identical and similar pages across VMs can be passed to a hypervisor (not shown) so the new VM or migrating VM can be collocated to the server 105 that offers the most sharing potential in terms of identical and similar pages. In addition, the hypervisor can receive information about identical pages and eliminate copies of identical pages. In this way, by using hash functions and Bloom filters, sharing potential is computed for both identical and similar pages at a sub-granularity level. Of further note, the differences between similar pages can be stored. In addition, computational overhead can be reduced.

Figure 2:
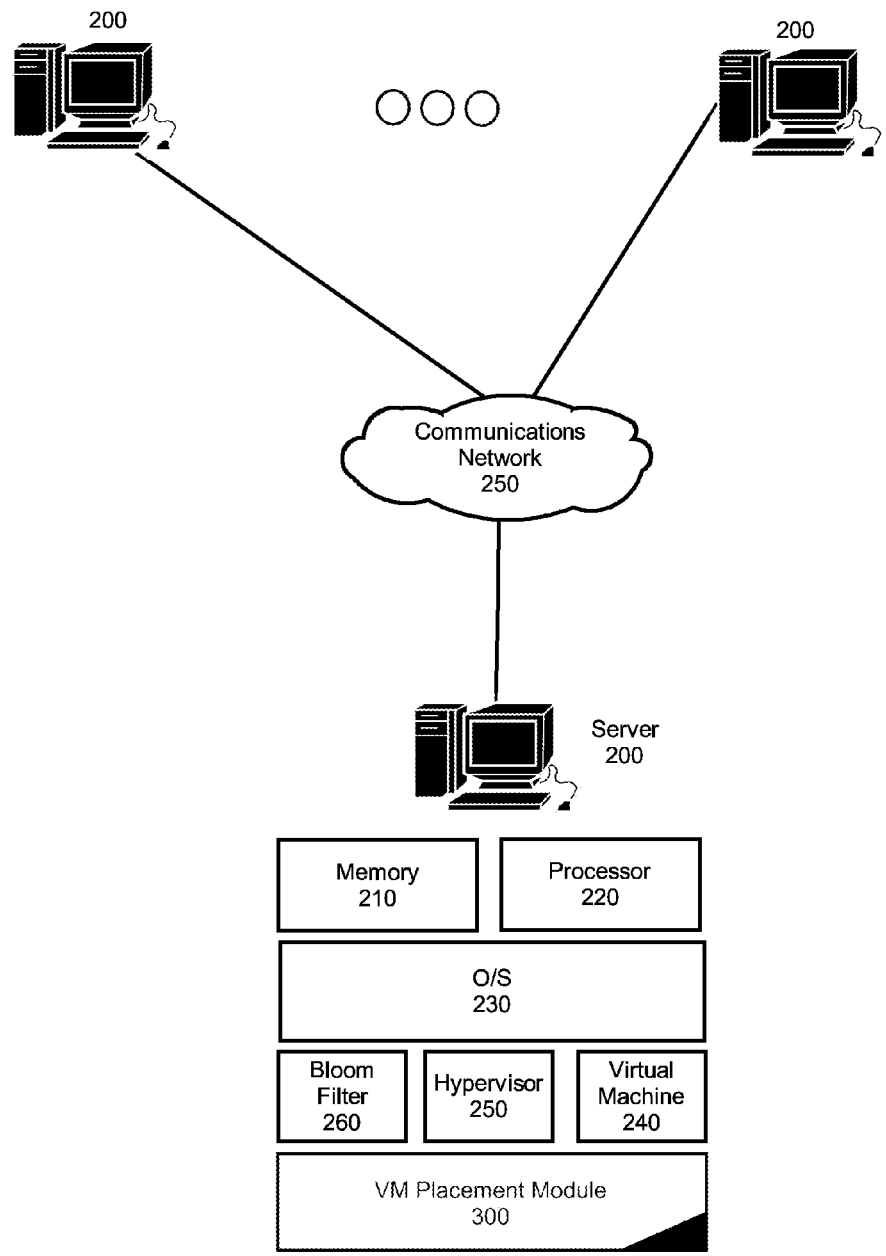
FIG. 2 is a schematic illustration of a VM collocating system.

The process described in connection with FIG. 1 can be implemented in a VM collocating system. In further illustration, FIG. 2 is schematically shows a VM collocating system. The system can include at least one server 200. The server 200 can include at least one processor 220 and memory 210 supporting the execution of an operating system (O/S) 230. The O/S 230 in turn can support at least one Bloom filter 260, a hypervisor 250, at least one virtual machine 240, and a VM collocate module 300. Of note, a server 200 can communicate with other servers 200 via a communications network 250. The communications network can include the Internet, wireless communications, Ethernet, 3G, and 4G. Of note, each server 200 can include memory 210, at least one processor 220, an O/S 230, at least one Bloom filter 260, a hypervisor 250, at least one virtual machine 240, and a VM collocate module 300, though for simplicity each are only shown for one server 200.

The VM collocate module 300 can include program code, which when executed by at least one processor 220 of the server 200 creates a first Bloom filter on content within each page in memory for each existing VM 240 on a server 200. Of note, the first Bloom filter can be a "startup" Bloom filter or a "current" Bloom filter. The VM collocate module 300 can further include program code to compute a memory sharing factor between each existing VM and a second VM upon creating a second Bloom filter for the second VM in response to receiving a placement request for the second VM. Of note, the memory sharing factor can be computed, in one instance, by performing an AND operation between the values in each first Bloom filter for each existing VM and the second Bloom filter for the second VM and adding bits of the resulting AND operation. Of further note, the second Bloom filter can be a "startup" Bloom filter or a "current" Bloom filter. The module 300 can further include program code to collocate the second VM with one existing VM of the existing VMs upon determining which existing VM has the highest memory sharing factor.

Figure 3:
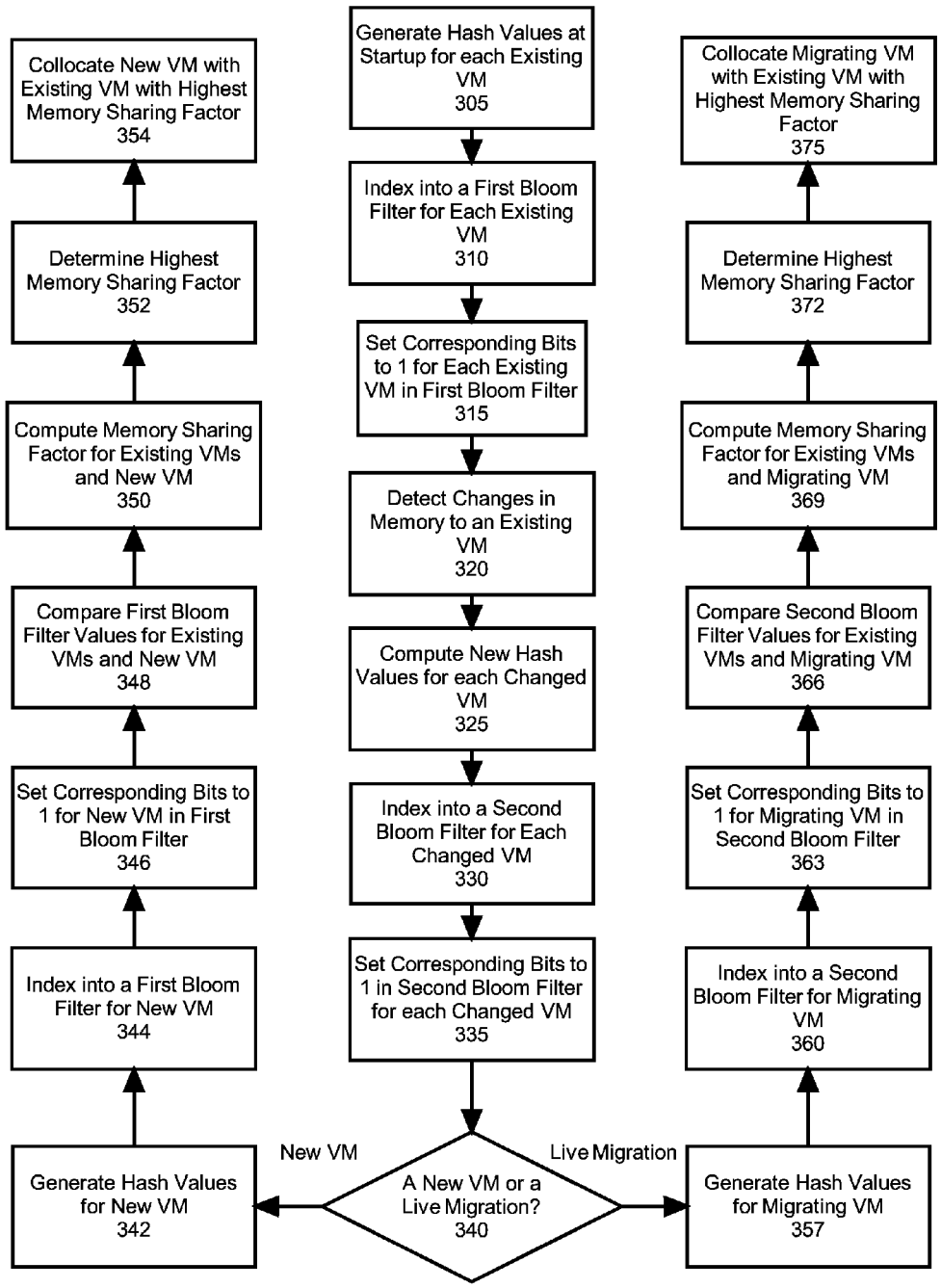
FIG. 3 is a flow chart illustrating a process for collocating a VM.

In even yet further illustration of the operation of the program code of the VM collocate module 300, FIG. 3 is a flow chart illustrating a process for collocating a VM. Beginning in step 305, a hash value can be generated at startup for all pages for each existing VM. Of note, in one instance, hash values can be created for chunks of sixty-four byte blocks of data. The hash values can be used to index into a first Bloom filter, such as a "startup" Bloom filter, for each existing VM, as shown in step 310, and the corresponding bits can be set to one, as in step 315. In step 320, upon detecting memory changes in an existing VM as, for instance, with successive writes, new hash values can be computed for each changed VM, as indicated in step 325. The new hash values can be used to index into a second Bloom filter, for instance a "current" Bloom filter, as in step 330, and the corresponding bits can be set to one, as indicated in step 335.

In step 340, a determination can be made as to whether a new VM needs to be placed or whether there is a live migration. Upon determining a new VM needs to be placed, hash values can be generated for the new VM, as in step 342. The hash values can be used to index into a first Bloom filter, for instance a "startup" Bloom filter, for the new VM, as shown in step 344. The corresponding bits can then be set to one, as in step 346. In step 348, the first Bloom filters values, such as the "startup" Bloom filters values, of the existing VMs and the new VM can be compared. In one instance, the first Bloom filter values of the existing VM and the new VM can be compared by performing an AND operation. A memory sharing factor can be computed for each existing VM and the new VM to be placed, as indicated in step 350, upon comparing the values in the Bloom filter. Of note, the bits of the result of the AND operation can be added to compute the memory sharing factor. In step 352, the highest memory sharing factor can be determined. The new VM can then be collocated with the existing VM having the highest memory sharing factory, as shown in step 354.

If there is a live migration, as determined at step 340, hash values can be generated for the migrating VM, as indicated in step 357. In step 360, the hash values can be used to index into a second Bloom filter, for instance a "current" Bloom filter, and the corresponding bits can be set to one in a second Bloom filter for the migrating VM, as shown in step 363. The second Bloom filter for each existing VM and the migrating VM can be compared, as indicated in step 366, so that a memory sharing factor can be computed for each existing VM and the migrating VM, as shown in step 369. Of note, the memory sharing factor can be computed by performing an AND operating between the second Bloom filter for each existing VM with which collocation is possible and the second Bloom filter for the migrating VM and adding the bits of the resulting AND operation. The highest memory sharing factor can then be determined, as in step 372. The migrating VM can then be collocated with the VM offering the most memory sharing benefit, as shown in step 375.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A virtual machine (VM) co-location method comprising:
    selecting a VM from amongst a plurality of VMs for server colocation;
    computing an individual shared memory factor for each of a set of the plurality of VMs with respect to the selected VM by creating a first Bloom filter for each of the VMs in the set, by creating a second Bloom filter for the selected VM, wherein the first Bloom filter and the second Bloom filter are startup Bloom filters when a new VM placement is performed for the selected VM, and the first Bloom filter and the second Bloom filter are current Bloom filters when a live migration is performed for the selected VM, and by computing a logical AND operation between sum of an intersection of values of the first Bloom filter and corresponding values of the second Bloom filter for each of the VMs in the set and by adding bits of a result of the AND operation for each of the VMs to produce the individual shared memory factor for each of the VMs in the set;
    determining a VM amongst the VMs in the set associated with a highest computed shared memory factor; and,
    co-locating the determined VM with the selected VM in a single server.

2. The method of claim 1, wherein the first Bloom filter is a Bloom filter selected from the group consisting of the startup Bloom filter and the current Bloom filter.

3. The method of claim 1, wherein the second Bloom filter is a Bloom filter selected from the group consisting of the startup Bloom filter and the current Bloom filter.

4. The method of claim 1, wherein at least one of the first and second Bloom filters is a counting Bloom filter.

* * * * *